US012681660B2

(12) United States Patent　　　　(10) Patent No.:　US 12,681,660 B2
Stonelake　　　　　　　　　　　　　(45) Date of Patent:　Jul. 14, 2026

(54) MEMORY ARCHITECTURE FOR BLOCK MIGRATION IN ZNS

(71) Applicant: Micron Technology, Inc., Boise, ID (US)

(72) Inventor: Paul Stonelake, Kihei, HI (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/980,680

(22) Filed: Dec. 13, 2024

(65) Prior Publication Data

US 2025/0199705 A1　　Jun. 19, 2025

Related U.S. Application Data

(60) Provisional application No. 63/612,197, filed on Dec. 19, 2023.

(51) Int. Cl.
G06F 3/06　　　　(2006.01)
(52) U.S. Cl.
CPC .......... G06F 3/0647 (2013.01); G06F 3/0604 (2013.01); G06F 3/0679 (2013.01)
(58) Field of Classification Search
CPC ...... G06F 3/0604; G06F 3/061; G06F 3/0647; G06F 3/0679
See application file for complete search history.

(56) References Cited

U.S. PATENT DOCUMENTS

2010/0169541 A1　　7/2010　Freikorn
2019/0108108 A1　　4/2019　Dallabora et al.

2021/0373809 A1*　12/2021　Benisty ................... G06F 3/061
2022/0057952 A1　　2/2022　Bueb
2023/0075437 A1　　3/2023　Xu et al.
2023/0176764 A1　　6/2023　Bhardwaj
2023/0195342 A1*　6/2023　Kim ...................... G06F 3/0679
　　　　　　　　　　　　　　　　　　　711/154
2024/0054971 A1*　2/2024　Cariello .............. G11C 16/102

FOREIGN PATENT DOCUMENTS

WO　　2025136833　　6/2025

OTHER PUBLICATIONS

"International Application Serial No. PCT US2024 060208, International Search Report mailed Apr. 17, 2025", 3 pages.
"International Application Serial No. PCT US2024 060208, Written Opinion mailed Apr. 17, 2025", 4 pages.

* cited by examiner

*Primary Examiner* — Aracelis Ruiz
(74) *Attorney, Agent, or Firm* — Schwegman Lundberg & Woessner, P.A.

(57)　　　　　ABSTRACT

The disclosure configures a memory sub-system controller to efficiently perform block migration (e.g., from SLC cache to QLC blocks) in a Zone Namespace (ZNS) device. The controller associates a plurality of zones of the set of memory components with a plurality of internal zone groups (IZGs) each associated with a different write cursor. The controller programs data to a first portion of a set of memory components using the plurality of write cursors, the first portion being associated with a first type of storage, and determines that an individual IZG of the plurality of IZGs satisfies a migration criterion. The controller migrates a portion of the data stored in the first portion of the set of memory components corresponding to the individual IZG to a second portion of the set of memory components, the second portion of the set of memory components being associated with a second type of storage.

20 Claims, 5 Drawing Sheets

400

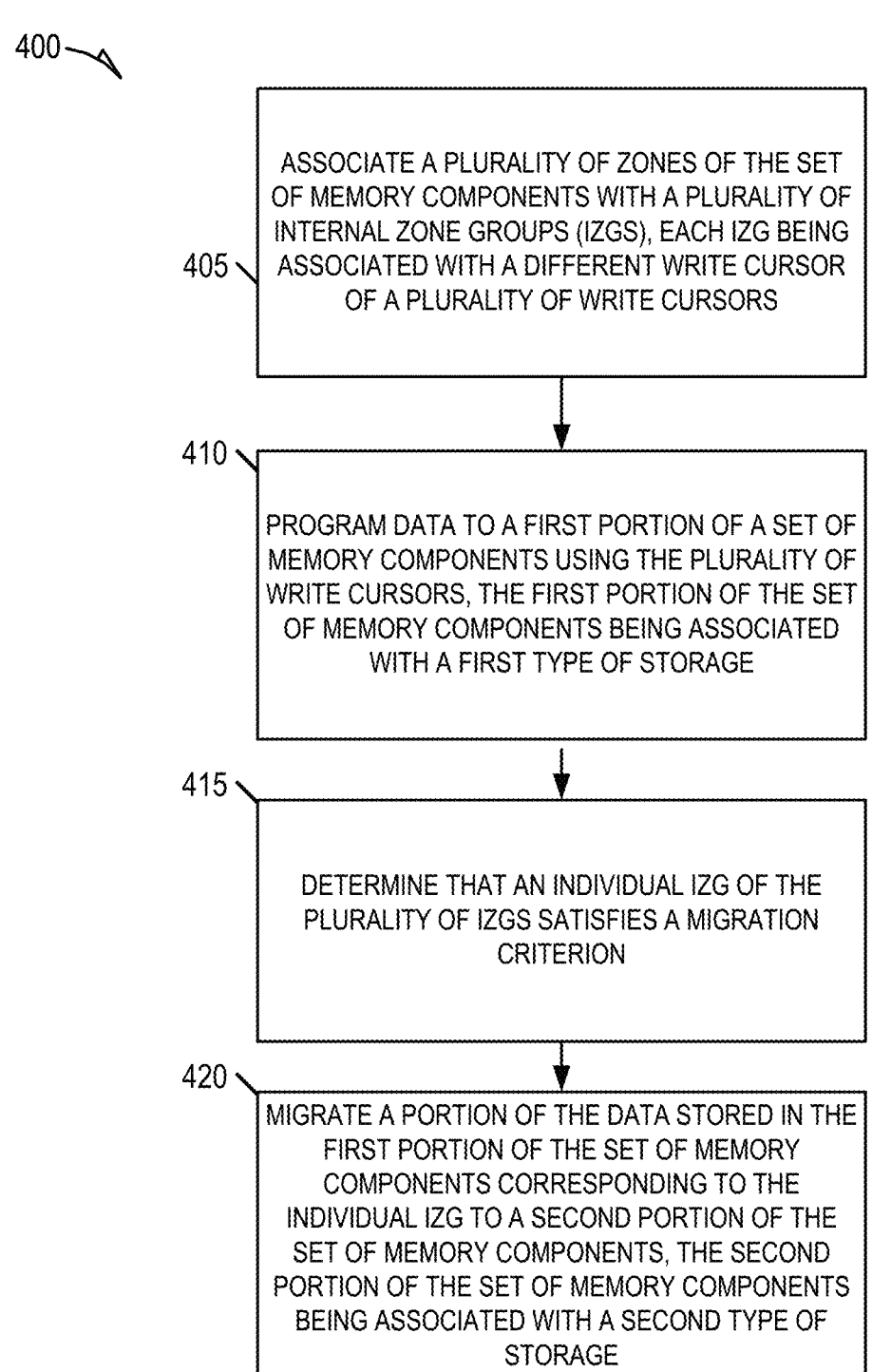

405

ASSOCIATE A PLURALITY OF ZONES OF THE SET OF MEMORY COMPONENTS WITH A PLURALITY OF INTERNAL ZONE GROUPS (IZGS), EACH IZG BEING ASSOCIATED WITH A DIFFERENT WRITE CURSOR OF A PLURALITY OF WRITE CURSORS

410

PROGRAM DATA TO A FIRST PORTION OF A SET OF MEMORY COMPONENTS USING THE PLURALITY OF WRITE CURSORS, THE FIRST PORTION OF THE SET OF MEMORY COMPONENTS BEING ASSOCIATED WITH A FIRST TYPE OF STORAGE

415

DETERMINE THAT AN INDIVIDUAL IZG OF THE PLURALITY OF IZGS SATISFIES A MIGRATION CRITERION

420

MIGRATE A PORTION OF THE DATA STORED IN THE FIRST PORTION OF THE SET OF MEMORY COMPONENTS CORRESPONDING TO THE INDIVIDUAL IZG TO A SECOND PORTION OF THE SET OF MEMORY COMPONENTS, THE SECOND PORTION OF THE SET OF MEMORY COMPONENTS BEING ASSOCIATED WITH A SECOND TYPE OF STORAGE

*FIG. 4*

MEMORY ARCHITECTURE FOR BLOCK MIGRATION IN ZNS

PRIORITY APPLICATION

This application claims the benefit of priority to U.S. Provisional Application Ser. No. 63/612,197, filed Dec. 19, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various examples of the disclosure.

FIG. 4 is a flow diagram of an example method or process for a memory controller to program data corresponding to a periodic commit stream in a different data layout from data associated with a flush operation, in accordance with some examples.

DETAILED DESCRIPTION

Figure 1:
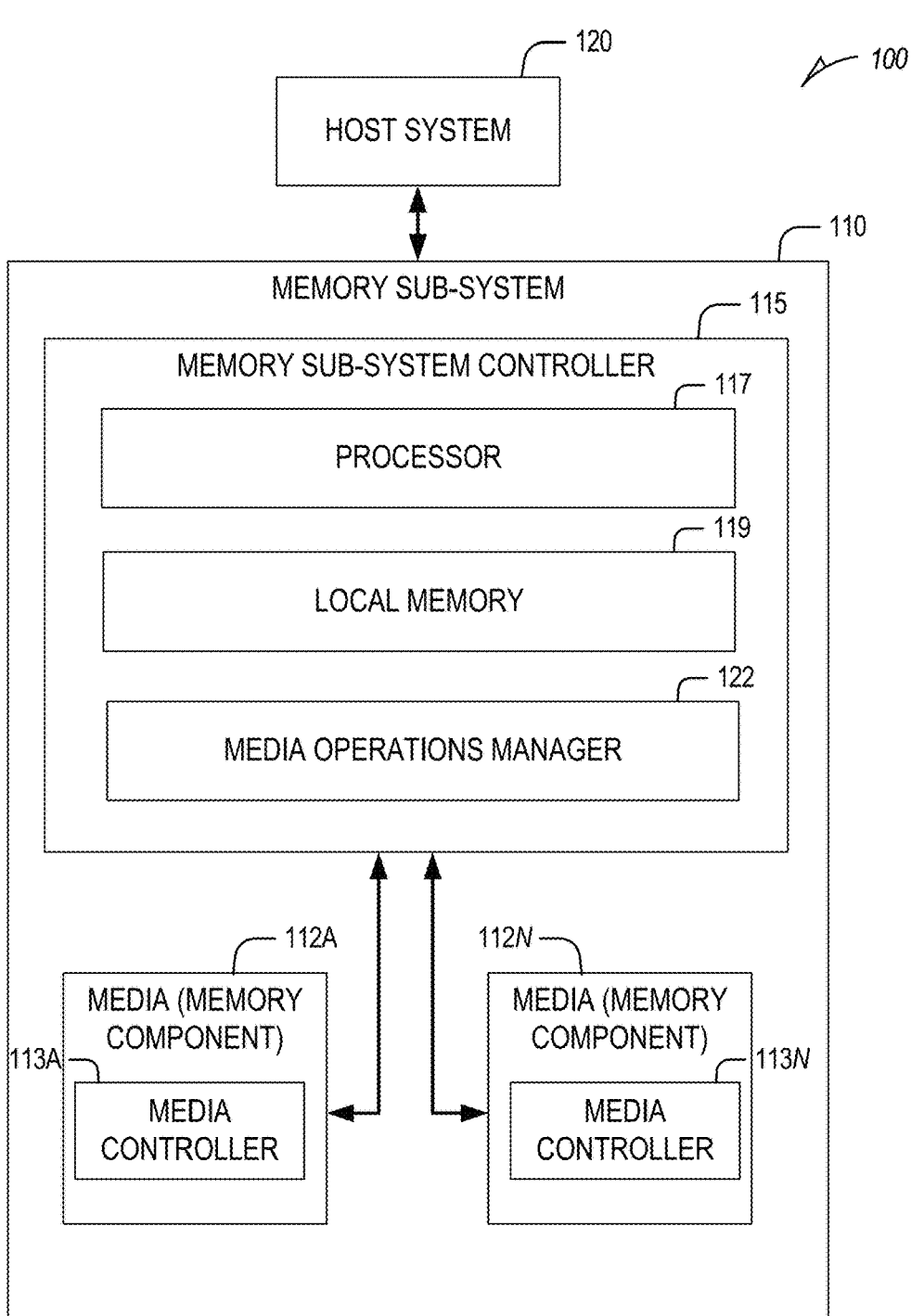
FIG. 1 is a block diagram illustrating an example computing environment including a memory sub-system, in accordance with some examples.

Examples of the present disclosure configure a system component, such as a memory sub-system controller, to intelligently, selectively, and dynamically migrate data from a first type of storage (e.g., single-level cell (SLC) storage) to a second type of storage (e.g., multi-level cell (MLC) storage or quad-level cell (QLC) storage). The controller can initially divide a set of zones in which data is stored by a host into separate internal zone groups (IZGs). Each IZG can be associated with a separate write cursor that is used to program data to a first portion of the memory components associated with the first type of storage. The controller tracks how many zones are programmed to completion and are ready for migration in each IZG. Based on that information, the controller intelligently selects an order in which zones in the different IZGs are migrated from the first portion of the memory components to a second portion of the memory components associated with the second type of storage. For example, the controller can first migrate zones associated with a second IZG (which have been programmed later than zones in a first IZG) before migrating zones associated with a first IZG.

In this way, the controller can reduce the write amplification (WA) associated with freeing up blocks in SLC storage during SLC cache to SLC cache folding operations. Also, the disclosed techniques improve the storage and retrieval of data from the memory components and reduce latency associated with migrating data from the SLC cache to QLC storage. The disclosed techniques also improve SLC endurance, provide better quality of service (QOS), reduce power consumption and/or allow more blocks to be allocated to QLC user capacity.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scans read all data and identify the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Conventional memory sub-systems utilize multiple types of storage (e.g., SLC storage and QLC storage) to improve the capacity of the memory system. For example, the conventional memory sub-systems initially program data temporarily to an SLC cache. After a certain set of blocks (e.g., four blocks) are programmed to the SLC cache, the memory controller migrates the data stored in the set of blocks to QLC storage to free up space in the SLC cache. Namely, the QLC storage can store four times the amount of data that SLC stores. By migrating data in this way, data that occupies four blocks in SLC storage can be moved into a single QLC block. The rationale for accumulating an entire QLC block is to mitigate challenges reading from a partially programmed QLC block; in this way, host reads are serviced from SLC until the entire QLC block of data is available for migration. There are challenges in selecting which SLC blocks to migrate and when to migrate such blocks.

Conventional memory sub-systems allow hosts to write data or program data in different zones of the memory system. Such zones in Zone Name Space (ZNS) are ranges of LBA space, of fixed size, that are usually written sequentially from start to end by the host, after which the zone is transitioned to full state. Typically, a zone is mapped to 1 or a multiple number of QLC blocks. The host is free to write a number of zones concurrently, up to a maximum number of active zones, at different rates, but each zone itself must be written sequentially. Each zone is written sequentially, but active zones can be written in any order or at different rates by the host. A zone is migrated after the host has written the last LBA of the zone and the zone is full or the host explicitly finishes the zone early.

Conventional memory sub-systems usually migrate data from zones in SLC storage to QLC storage in the order that the host finishes the zone. Namely, the memory sub-systems wait for a certain set of zones to be completely filled or programmed in the SLC cache and then migrate that set of zones in order of host completion to the QLC storage. While such approaches generally work, the need to wait for the set of zones to be completely programmed (e.g., the ZNS zone is full) delays migration and can incur unnecessary WA as data in the zones needs to be folded when there is insufficient free SLC space available and/or when there is insufficient valid data in the zones. This can reduce the efficiency at which data is read/stored on the memory sub-systems and can slow down the overall memory sub-system and can prolong performing other operations.

Examples of the present disclosure address the above and other deficiencies by providing a memory controller that can intelligently, selectively, and dynamically migrate data from a first type of storage (e.g., single-level cell (SLC) storage) to a second type of storage (e.g., multi-level cell (MLC) storage or quad-level cell (QLC) storage). The disclosed examples can divide a set of zones in which data is stored by a host into separate IZGs. Each IZG can be associated with a separate write cursor that is used to program data to a first portion of the memory components associated with the first type of storage. The disclosed examples track how many zones are programmed to completion and are ready for migration in each IZG. Based on that information, the disclosed examples intelligently select an order in which zones in the different IZGs are migrated from the first portion of the memory components to a second portion of the memory components associated with the second type of storage. In this way, zones can be migrated out of order or sequence in which they are programmed and based on which IZG has the most number of zones ready to be migrated. This improves the overall efficiency of operating the memory sub-system and reduces WA of the SLC cache.

In some examples, the memory controller associates a plurality of zones of the set of memory components with a plurality of internal zone groups (IZGs), each IZG being associated with a different write cursor of a plurality of write cursors. The memory controller programs data to a first portion of the set of memory components using the plurality of write cursors, the first portion of the set of memory components being associated with a first type of storage. The memory controller determines that an individual IZG of the plurality of IZGs satisfies a migration criterion. The memory controller, in response to determining that the individual IZG of the plurality of IZGs satisfies the migration criterion, migrates a portion of the data stored in the first portion of the set of memory components corresponding to the individual IZG to a second portion of the set of memory components, the second portion of the set of memory components being associated with a second type of storage.

In some examples, the first type of storage includes a single-level cell (SLC) storage type and the second type of storage includes a multi-level cell (MLC) storage type. In some examples, the first type of storage includes a single-level cell (SLC) storage type and the second type of storage includes a quad-level cell (QLC) storage type.

In some examples, the migration criterion includes a minimum quantity of zones that are ready to be migrated in a particular IZG. In some examples, the memory controller stores a plurality of counters each associated with a different IZG, each counter of the plurality of counters representing a quantity of zones in a respective IZG ready for migration from the first type of storage to the second type of storage. In some cases, the memory controller receives, from a host, a request to program data into a first zone of the plurality of zones. The memory controller determines that the first zone is associated with the individual IZG and identifies an individual write cursor of the plurality of write cursors that is associated with the individual IZG. The memory controller programs the data to the first zone using the individual write cursor in the first portion of the set of memory components.

In some examples, the memory controller determines that the first zone has been completely filled. The memory controller, in response to determining that the first zone has been completely filled (e.g., when a last logical block address (LBA) associated with the first zone has been programmed with data), increments an individual counter of the plurality of counters that is associated with the individual IZG.

In some examples, the memory controller compares a first value of a first counter of the plurality of counters to a second value of a second counter of the plurality of counters. The memory controller determines that the first IZG is associated with a greater number of zones ready for migration than a second IZG in response to determining that the first value is greater than the second value. The memory controller migrates data of the zones associated with the first IZG stored in the first portion of the set of memory components to the second portion of the set of memory components in response to determining that the first IZG is associated with the greater number of zones ready for migration than the second IZG.

In some examples, the memory controller, after migrating the portions of the data corresponding to the individual IZG, migrates a second portion of the data stored in the first portion of the set of memory components corresponding to a second IZG to the second portion of the set of memory components. In some cases, the first portion of the set of memory components includes single-level cell (SLC) cache. In some cases, the memory controller folds data corresponding to the individual IZG.

In some cases, the memory controller determines how many write cursors are in the plurality of write cursors. The memory controller generates the plurality of IZGs based on how many write cursors are in the plurality of write cursors. In some examples, the memory controller generates a quantity of IZGs corresponding to double a number of write cursors.

In some examples, the memory controller stores an active zone table that maps each of the plurality of zones to a corresponding IZG, the active zone table mapping a first set of zones of the plurality of zones to a first IZG, and the active zone table mapping a second set of zones of the plurality of zones to a second IZG. In some cases, the memory controller receives a request from a host to program data to an individual zone of the plurality of zones. The memory controller determines, based on the active zone table, that the individual zone is included in the first set of zones that is associated with the first IZG. The memory controller selects an individual write cursor from the plurality of write cursors by computing a modulo operation of a number representing the individual zone and a number representing how many write cursors are in the plurality of write cursors. In some examples, the memory controller programs data to the first portion of a set of memory components using the selected individual write cursor. In some examples, a first write cursor of the plurality of write cursors groups a first collection of zones into a first set of block stripes. A second write cursor of the plurality of write cursors groups a second collection of zones into a second set of block stripes.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components and/or storage devices. An example of non-volatile memory components include a negative-and (NAND)-type flash memory. Each of the memory components 112A to 112N can include one or more arrays of memory cells associated with one or more types of storage, such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

In some examples, a first portion of the memory components 112A to 112N can be associated with a first type of storage (e.g., SLC type of storage) and can operate as an SLC cache. Data received from the host system 120 can initially be programmed into the first portion of the memory components 112A to 112N and then be migrated into a second portion of the memory components 112A to 112N associated with a second type of storage (e.g., QLC type of storage). The media operations manager 122 can manage this migration using IZGs and counters associated with the IZGs representing a quantity or number of zones in each IZG ready to be migrated. In some examples, a zone is considered to be ready for migration when a last LBA of the zone has been programmed by the host system 120.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe, and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as enhancement operations, different scan rates, different scan frequencies, different wear leveling, different read disturb management, garbage collection operations, different near miss ECC operations, data migration operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime (maximum) PEC values and/or reliability grades associated with different groups of the memory components 112A to 112N and/or different blocks within each of the memory components 112A to 112N. The configuration data can also include various manufacturing information for individual memory components of the memory components 112A to 112N. The manufacturing information can specify the reliability metrics/information associated with each memory component. The configuration information for the first data and second data layouts can specify a quantity (number) of planes and quantity (number) of dies across which to program the data and/or quantity (number) of write cursors to associate with each type of data. The configuration information can store data indicating the total number of available write cursors that can be used to program data to the memory components 112A to 112N. For example, a first write cursor can be used to program data to a first region of the memory components 112A to 112N (e.g., a first memory die) simultaneously with a second write cursor programming data to a second region of the memory components 112A to 112N (e.g., a second memory die). Utilizing multiple write cursor increases the amount of data that can be read/written from the memory components 112A to 112N in parallel or simultaneously. Based on the total number of available write cursors, the configuration data also stores data indicating a total quantity or number of IZGs that can be utilized/allocated to store data to the first portion of the memory components 112A to 112N (corresponding to SLC storage). In some cases, the total number of IZGs can be computed by doubling the total number of write cursors.

In some examples, the commands or operations received from the host system 120 can include a write/read command, which can specify or identify an individual memory component in which to program/read data and/or a specific zone in which to program the data. Based on the memory component or zone specified by the write/read command, the memory sub-system controller 115 can program/read the data into/from one or more of the memory components 112A to 112N. The memory sub-system controller 115 can be responsible for other memory management operations, such as wear leveling operations, garbage collection operations, error detection and error-correcting code (ECC) operations, encryption operations, caching operations, data migration, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to associate a plurality of zones of the set of memory components with a plurality of internal zone groups (IZGs) each associated with a different write cursor. The media operations manager 122 programs data to a first portion of a set of memory components using the plurality of write cursors, the first portion being associated with a first type of storage and determines that an individual IZG of the plurality of IZGs satisfies a migration criterion. The media operations manager 122 migrates a portion of the data stored in the first portion of the set of memory components corresponding to the individual IZG to a second portion of the set of memory components, the second portion of the set of memory components being associated with a second type of storage.

This increases the overall efficiency of operating the memory sub-system 110 because rather than migrating data from zones in the order in which the host finished programming the zone (or sequentially), data can be migrated based on which IZG has the most number of zones ready to be migrated (which can be non-sequential or out of the order in which the zones are finished being programmed). This can reduce the number of folding operations that need to be performed for data in the SLC cache. This increases the overall efficiency of programming and reading data from the memory sub-system 110.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

In some examples, the media operations manager 122 accesses configuration data to determine how many write cursors are available and associated with the set of memory components 112A to 112N. The media operations manager 122 can then multiply that quantity by a factor (e.g., two) to compute the maximum number of active zones (e.g., IZGs) that can be allocated to the host system 120. For example, the configuration data can specify that four write cursors are available. In such cases, the media operations manager 122 can determine that a total of eight IZGs can be allocated to the host system 120. Each IZG can include a respective collection of zones. A first portion (e.g., a first half) of the maximum number of IZGs that are available can be used to allocate zones for a host system 120 to write data in a first portion of the set of memory components 112A to 112N (e.g., SLC cache). A second portion (e.g., a second half) of the maximum number of IZGs can be preserved for allocating zones for the host system 120 to write data to while data is being migrated from the first portion to the second portion of the set of memory components 112A to 112N (e.g., QLC storage). As each zone is opened by the host system 120, the media operations manager 122 can assign that zone to a particular IZG.

Figure 2:
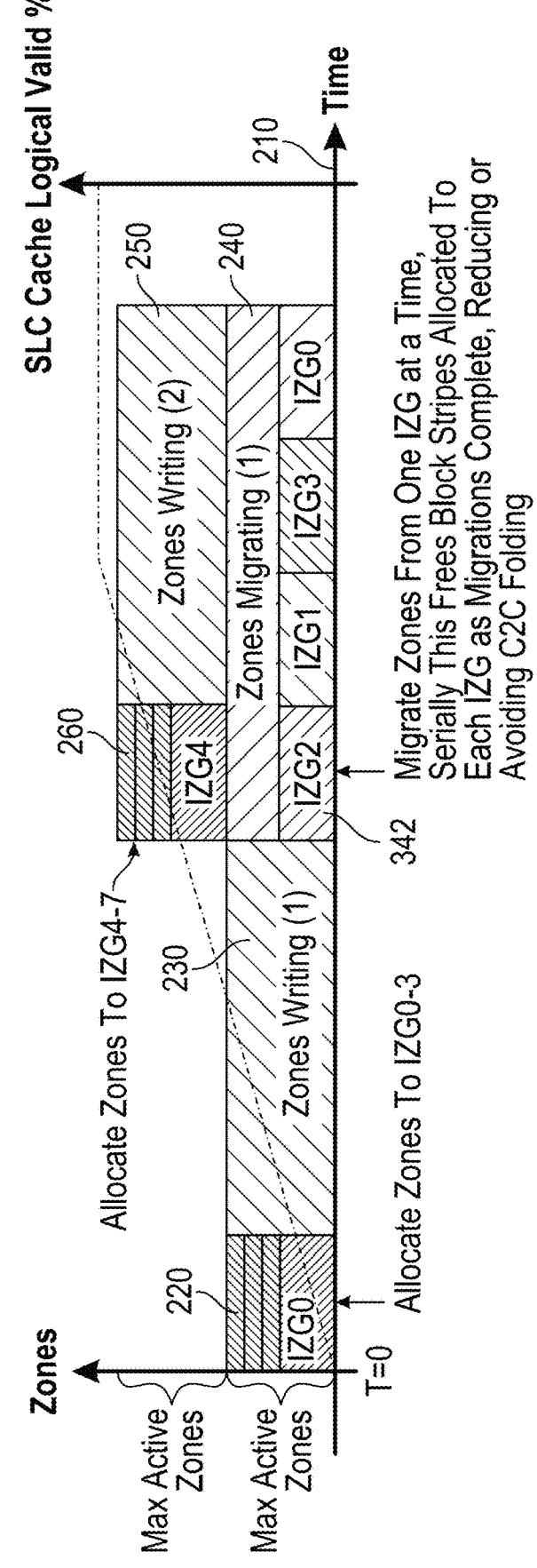
FIG. 2 is a block diagram of an example timeline of data migration operations, in accordance with some examples.

FIG. 2 is a block diagram of an example timeline 200 of data migration operations performed by the media operations manager 122, in accordance with some examples. For example, at time 0 (initially when the memory sub-system 110 is started), the media operations manager 122 can allocate zones opened by the host system 120 across four different IZGs 220 (IZG0-IZG3). During a second time period 230, data received from the host system 120 is programmed to different ones of the four different IZGs 220. This can be performed in parallel using different write cursors.

In some examples, the media operations manager 122 can generate an active zone table. The active zone table can be used to map different zones opened or referenced by the host system 120 with a corresponding IZG. The media operations manager 122 controls writing or programming data to the first portion of the set of memory components 112A to 112N based on the mapping specified in the active zone table.

For example, the media operations manager 122 can receive a request from the host system 120 to program a first set of data to a first zone. The media operations manager 122 can search the active zone table to determine whether the first zone is currently mapped to any IZG. In response to determining that the active zone table currently excludes the first zone, the media operations manager 122 adds the first zone to the active zone table in association with an individual IZG. The individual IZG can be randomly selected or can correspond to the next IZG of the available IZGs (the four IZGs) that has the fewest associated zones. The media operations manager 122 can then identify a write cursor of a plurality of write cursors to use to program the first set of data to the individual IZG. In some cases, the media operations manager 122 identifies the write cursor by computing a modulo operation of the individual IZG number (e.g., IZG3) and the total number of available write cursors (e.g., four). In this case, the media operations manager 122 selects the third write cursor and programs the first set of data to the first zone in the individual IZG of the first portion of the set of memory components 112A to 112N (e.g., the SLC cache).

In some cases, the media operations manager 122 can receive a request from the host system 120 to program a second set of data to a second zone. The media operations manager 122 can search the active zone table to determine whether the second zone is currently mapped to any IZG. In response to determining that the active zone table currently associates the second zone with a second IZG (e.g., IZG2), the media operations manager 122 identifies the write cursor to use to program the requested data. This can be done by computing a modulo operation of the second IZG number (e.g., IZG2) and the total number of available write cursors (e.g., four). In this case, the media operations manager 122 selects the second write cursor and programs the second set of data to the second zone in the second IZG of the first portion of the set of memory components 112A to 112N (e.g., the SLC cache).

While data is being programmed into zones of different IZGs, the media operations manager 122 can maintain a counter for each IZG. The counter can specify the number of zones in the respective IZG that are ready to be migrated. For example, the media operations manager 122 can continue receiving requests from the host system 120 to program data in the first zone. The media operations manager 122 can maintain a first counter in association with the individual IZG (associated with the first zone). Once the host system 120 programs the last LBA of the first zone, the media operations manager 122 can increment the counter for the individual IZG. This counter is incremented to indicate an increase in the total number of zones in the individual IZG that are ready to be migrated (e.g., from the SLC storage to QLC storage).

Similarly, the media operations manager 122 can continue receiving requests from the host system 120 to program data in the second zone. The media operations manager 122 can maintain a second counter in association with the second IZG (associated with the second zone). Once the host system 120 programs the last LBA of the second zone, the media operations manager 122 can increment the counter for the second IZG. This counter is incremented to indicate an increase in the total number of zones in the second IZG that are ready to be migrated (e.g., from the SLC storage to QLC storage).

The media operations manager 122 can compare the count values of each counter associated with the different IZGs. The media operations manager 122 can determine which count value is the greatest among the different counters. Based on that determination, the media operations manager 122 selects which IZG is used first to migrate data. Namely, the count values stored in the counters can control the order in which data is migrated from different IZGs to QLC storage. The media operations manager 122 can begin migrating data from the IZG having the most zones ready for migration and ending with the IZG having the fewest zones ready for migration. This allows the host system 120 more time to fill up the zones in the last IZG in the list while the media operations manager 122 is migrating data from other zones in the list.

For example, at a third time period 240 after the second time period 230 along the time axis 210, the media operations manager 122 determines that zones stored in the IZGs need to be migrated. The media operations manager 122 can selectively and intelligently select zones from specific IZGs to migrate based on analyzing one or more migration criteria. Specifically, the media operations manager 122 can determine that the count value of the counter corresponding to the second IZG 342 is greater than the count value of all the other IZG (e.g., IZG0, IZG1, and IZG3). In response, the media operations manager 122 adds the second IZG 342 to a migration table that lists the order in which IZGs are migrated from SLC storage to QLC storage (e.g., from the first portion of the set of memory components 112A to 112N associated with the first type of storage to the second portion of the set of memory components 112A to 112N associated with the second type of storage). The media operations manager 122 can sequentially arrange the IZGs in decreasing order based on their respective counter values and store that sequence in the migration table.

The migration table can include a list of zones (e.g., LBAs) associated with each IZG. The media operations manager 122 can then start copying over data from the LBAs corresponding to the IZGs to new physical locations corresponding to the second portion of the set of memory components 112A to 112N associated with the second type of storage. For example, the media operations manager 122 can start by copying data from the first IZG in the migration table (e.g., IZG2) to the second portion of the set of memory components 112A to 112N associated with the second type of storage. After each zone of data is copied, the physical locations in the first type of storage can be freed. Initially, this will correspond to zones in IZG2 in this example. For example, the data is copied to the second portion of the set of memory components 112A to 112N associated with the second type of storage, the media operations manager 122 can free up all the zones or LBAs corresponding to IZG2 for allocation to the host system 120 to use for storing new data.

When all that data is copied from the first IZG in the migration table, the media operations manager 122 starts copying over to the second portion of the set of memory components 112A to 112N associated with the second type of storage the data from the second IZG in the migration table (e.g., IZG1). For example, the media operations manager 122 can reduce the counter associated with the zone currently being migrated as each zone of the IZG is being migrated. When the counter reaches zero, then the media operations manager 122 selects the next IZG in the list to migrate to the second portion of the set of memory components 112A to 112N associated with the second type of storage. For example, the IZG2 may currently be selected for migration and can include a first set of zones. The media operations manager 122 can select a first zone in the first set of zones to migrate to the second portion of the set of memory components 112A to 112N associated with the second type of storage. After the first zone is migrated, the media operations manager 122 reduces the count value of the counter corresponding to IZG2 and selects a second zone of the first set of zones to migrate to the second portion of the set of memory components 112A to 112N associated with the second type of storage. This process continues until the counter reaches 0 indicating all of the zones in the IZG2 have been migrated. At this point, the media operations manager 122 selects the next IZG to migrate that has a count value greater than other IZGs that have not yet been migrated. The media operations manager 122 again migrates the zones from the next IZG and reduces the count value until all of the zones are migrated successfully.

In some examples, while the media operations manager 122 is migrating zones from the list of IZGs to the second portion of the set of memory components 112A to 112N associated with the second type of storage, the media operations manager 122 can continue receiving requests to program data from the host system 120. For example, in response to receiving a request to program data from the host system 120 to a third zone, the media operations manager 122 allocates a new IZG (e.g., IZG4) which is an IZG that is not currently being migrated and is not in the migration table. The media operations manager 122 can maintain a new list of IZGs 260 that are ready to be allocated and associated with a new set of zones specified by the host system 120. The media operations manager 122, during a time period 250 that overlaps the third time period 240, associates zones with IZGs in the new list of IZGs 260 in a similar manner as discussed above.

For example, the media operations manager 122 can receive a request from the host system 120 to program a third set of data to a third zone (that is excluded from the zones being migrated and associated with the IZGs0-3). The media operations manager 122 can search the active zone table to determine whether the third zone is currently mapped to any IZG in the new list of IZGs 260. In response to determining that the active zone table currently associates the third zone with a fifth IZG (e.g., IZG4), the media operations manager 122 identifies the write cursor to use to program the requested data. This can be done by computing a modulo operation of the fifth IZG number (e.g., IZG4) and the total number of available write cursors (e.g., four). In this case, the media operations manager 122 selects the first write cursor and programs the third set of data to the third zone in the fourth IZG of the first portion of the set of memory components 112A to 112N (e.g., the SLC cache).

While data is being programmed into zones of different IZGs, the media operations manager 122 can maintain a counter for each IZG in the new list of IZGs 260, as discussed above. The counter can specify the number of zones in the respective IZG that are ready to be migrated. In some examples, while zones are being migrated from the IZGs in the migration table, the media operations manager 122 can perform folding operations. The folding operations can be used to perform garbage collection on zones that contain a specified number of invalid blocks to free up storage space in the first portion of the set of memory components 112A to 112N (e.g., the SLC cache).

Figure 3:
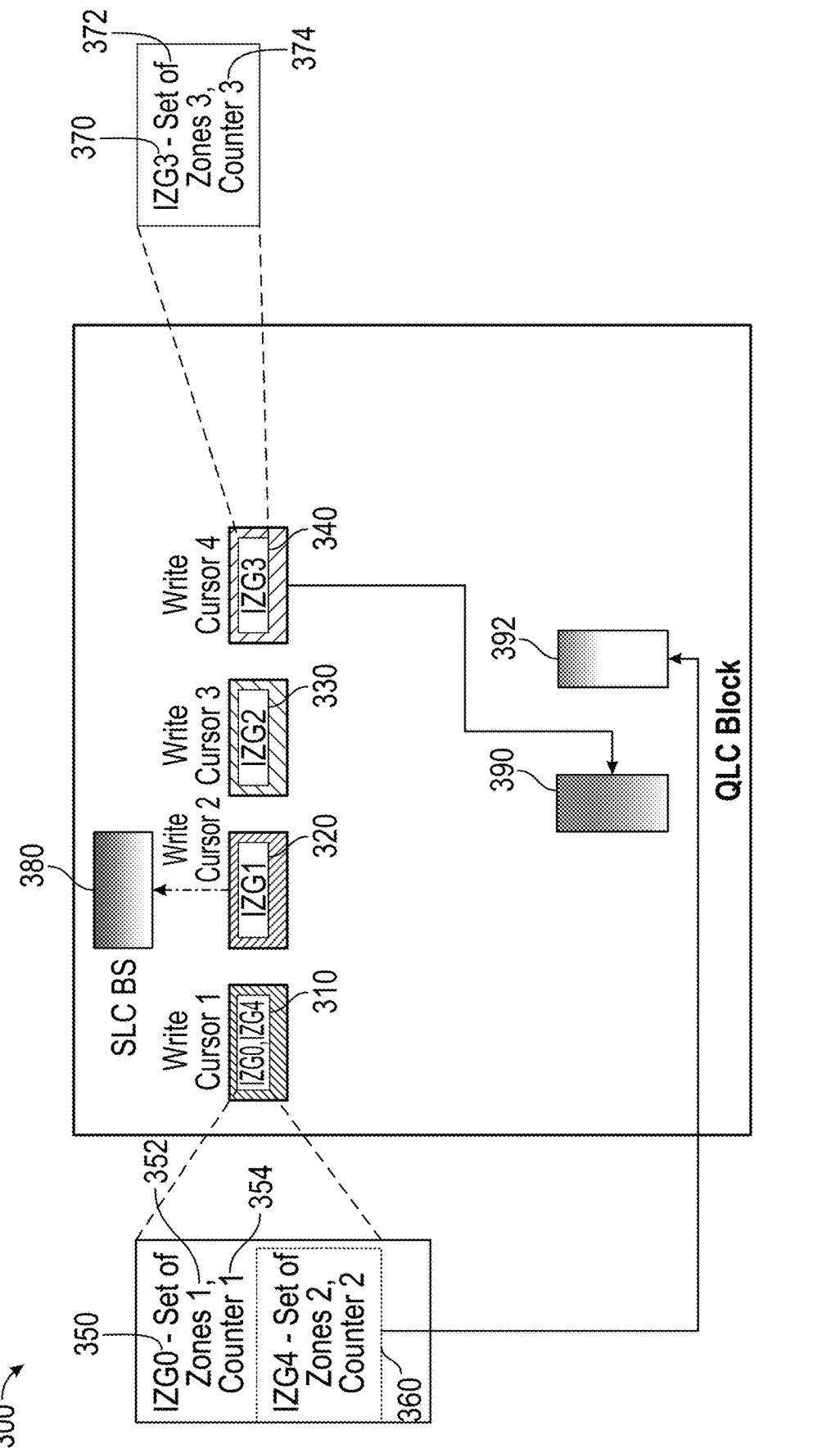
FIG. 3 illustrates storage of data in different types of storage of memory components, in accordance with some examples.

FIG. 3 illustrates storage of data in different types of storage of memory components, in accordance with some examples. Specifically, the media operations manager 122 can program data received from the host to multiple zones in parallel using multiple write cursors. Namely, the media operations manager 122 can program a first set of zones 352 to a first collection of memory components 112A to 112N of a first portion of the memory components 112A to 112N using a first write cursor 310. The first set of zones 352 can correspond to and be associated with a first IZG 350. The media operations manager 122 can also program a second set of zones to the first collection of memory components 112A to 112N of the first portion of the memory components 112A to 112N using the first write cursor 310. The second set of zones can correspond to and be associated with a fifth IZG 360.

In parallel with programming the first set of zones 352 to the first collection of memory components 112A to 112N using a first write cursor 310, the media operations manager 122 can program a third set of zones to a second collection of memory components 112A to 112N of the first portion of the memory components 112A to 112N using a second write cursor 320. The third set of zones can correspond to and be associated with a second IZG. The media operations manager 122 can program a fourth set of zones to a third collection of memory components 112A to 112N of the first portion of the memory components 112A to 112N using a third write cursor 330. The fourth set of zones can correspond to and be associated with a third IZG. The media operations manager 122 can program a fifth set of zones 372 to a fourth collection of memory components 112A to 112N of the first portion of the memory components 112A to 112N using a fourth write cursor 340. The fifth set of zones can correspond to and be associated with a fourth IZG 370 (IZG3).

The media operations manager 122 can determine a need to migrate data from the zones of one or more IZGs to the second portion of the set of memory components 112A to 112N (e.g., one or more QLC blocks 390). In response, the media operations manager 122 can access the counter of each IZG that has been stored. The media operations manager 122 can search for the IZG having the highest counter value. For example, the media operations manager 122 can compare the counter 354 associated with the first IZG 350 with the counter 374 associated with the fourth IZG 370. In response to determining that the counter 354 is smaller than the counter 374, the media operations manager 122 can select to migrate the fourth IZG 370 (e.g., the zones associated with the fourth IZG 370) first and before the zones associated with the first IZG 350.

While data is being migrated, the media operations manager 122 can also perform cache-to-cache (e.g., SLC cache to SLC cache) (C2C) folding operations. This can result in generating a free block 380 when a specified number of invalid data is present in one or more blocks corresponding to zones and/or IZGs. Eventually, after all of the zones associated with an initial group of IZGs (e.g., the first four IZGs) that have been allocated to the host system 120 are migrated to the one or more QLC blocks 390, the media operations manager 122 can begin migrating data from the fifth IZG 360 that were allocated to the host system 120 while the initial group of IZGs were being migrated. The fifth IZG 360 can include the second set of zones and can be migrated to another set of QLC blocks 392.

FIG. 4 is a flow diagram of an example method 400 (or process) to allow a memory controller to program data corresponding to a periodic commit stream in a different data layout from data associated with a flush operation, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 400 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405, with a media operations manager 122 of a memory sub-system (e.g., memory sub-system 110) associating a plurality of zones of the set of memory components with a plurality of internal zone groups (IZGs), each IZG being associated with a different write cursor of a plurality of write cursors. Then, at operation 410, the media operations manager 122 programs data to a first portion of the set of memory components using the plurality of write cursors, the first portion of the set of memory components being associated with a first type of storage and, at operation 415, determines that an individual IZG of the plurality of IZGs satisfies a migration criterion. At operation 420, the media operations manager 122, in response to determining that the individual IZG of the plurality of IZGs satisfies the migration criterion, migrates a portion of the data stored in the first portion of the set of memory components corresponding to the individual IZG to a second portion of the set of memory components, the second portion of the set of memory components being associated with a second type of storage.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: associating a plurality of zones of the set of memory components with a plurality of internal zone groups (IZGs), each IZG being associated with a different write cursor of a plurality of write cursors; programming data to a first portion of the set of memory components using the plurality of write cursors, the first portion of the set of memory components being associated with a first type of storage; determining that an individual IZG of the plurality of IZGs satisfies a migration criterion; and in response to determining that the individual IZG of the plurality of IZGs satisfies the migration criterion, migrating a portion of the data stored in the first portion of the set of memory components corresponding to the individual IZG to a second portion of the set of memory components, the second portion of the set of memory components being associated with a second type of storage.

Example 2. The system of Example 1, wherein the first type of storage comprises a single-level cell (SLC) storage type, and wherein the second type of storage comprises a multi-level cell (MLC) storage type.

Example 3. The system of any one of Examples 1-2, wherein the first type of storage comprises a single-level cell (SLC) storage type, and wherein the second type of storage comprises a quad-level cell (QLC) storage type.

Example 4. The system of any one of Examples 1-4, wherein the migration criterion comprises a minimum quantity of zones that are ready to be migrated.

Example 5. The system of Example 4, the operations comprising: storing a plurality of counters each associated with a different IZG, each counter of the plurality of counters representing a quantity of zones in a respective IZG ready for migration from the first type of storage to the second type of storage.

Example 6. The system of Example 5, the operations comprising: receiving, from a host, a request to program data into a first zone of the plurality of zones; determining that the first zone is associated with the individual IZG; identifying an individual write cursor of the plurality of write cursors that is associated with the individual IZG; and programming the data to the first zone using the individual write cursor in the first portion of the set of memory components.

Example 7. The system of Example 6, the operations comprising: determining that the first zone has been completely filled; and in response to determining that the first zone has been completely filled, incrementing an individual counter of the plurality of counters that is associated with the individual IZG.

Example 8. The system of Example 7, the operations comprising: determining that a last logical block address (LBA) associated with the first zone has been programmed with data, the first zone being determined to be completely filled in response to determining that the last LBA associated with the first zone has been programmed with data.

Example 9. The system of any one of Examples 5-8, the operations comprising: comparing a first value of a first counter of the plurality of counters to a second value of a second counter of the plurality of counters; determining that a first IZG is associated with a greater number of zones ready for migration than a second IZG in response to determining that the first value is greater than the second value; and migrating data of the zones associated with the first IZG stored in the first portion of the set of memory components to the second portion of the set of memory components in response to determining that the first IZG is associated with the greater number of zones ready for migration than the second IZG.

Example 10. The system of any one of Examples 1-9, the operations comprising: after migrating the portion of the data corresponding to the individual IZG, migrating a second portion of the data stored in the first portion of the set of memory components, the second portion corresponding to a second IZG to the second portion of the set of memory components.

Example 11. The system of any one of Examples 1-10, wherein the first portion of the set of memory components comprises a single-level cell (SLC) cache.

Example 12. The system of any one of Examples 1-11, the operations comprising: folding data corresponding to the individual IZG.

Example 13. The system of any one of Examples 1-12, the operations comprising: determining how many write cursors are in the plurality of write cursors; and generating the plurality of IZGs based on how many write cursors are in the plurality of write cursors.

Example 14. The system of Example 13, comprising: generating a quantity of IZGs corresponding to double a number of write cursors.

Example 15. The system of Example 14, the operations comprising: storing an active zone table that maps each of the plurality of zones to a corresponding IZG, the active zone table mapping a first set of zones of the plurality of zones to a first IZG, and the active zone table mapping a second set of zones of the plurality of zones to a second IZG.

Example 16. The system of Example 15, the operations comprising: receiving a request from a host to program data to an individual zone of the plurality of zones; determining, based on the active zone table, that the individual zone is included in the first set of zones that is associated with the first IZG; and selecting an individual write cursor from the plurality of write cursors by computing a modulo operation of a number representing the individual zone and a number representing how many write cursors are in the plurality of write cursors.

Example 17. The system of Example 16, the operations comprising: programming data to the first portion of the set of memory components using the selected individual write cursor.

Example 18. The system of any one of Examples 1-17, wherein a first write cursor of the plurality of write cursors groups a first collection of zones into a first set of block stripes, and wherein a second write cursor of the plurality of write cursors groups a second collection of zones into a second set of block stripes.

Methods and computer-readable storage medium with instructions for performing any one of the above Examples.

Figure 5:
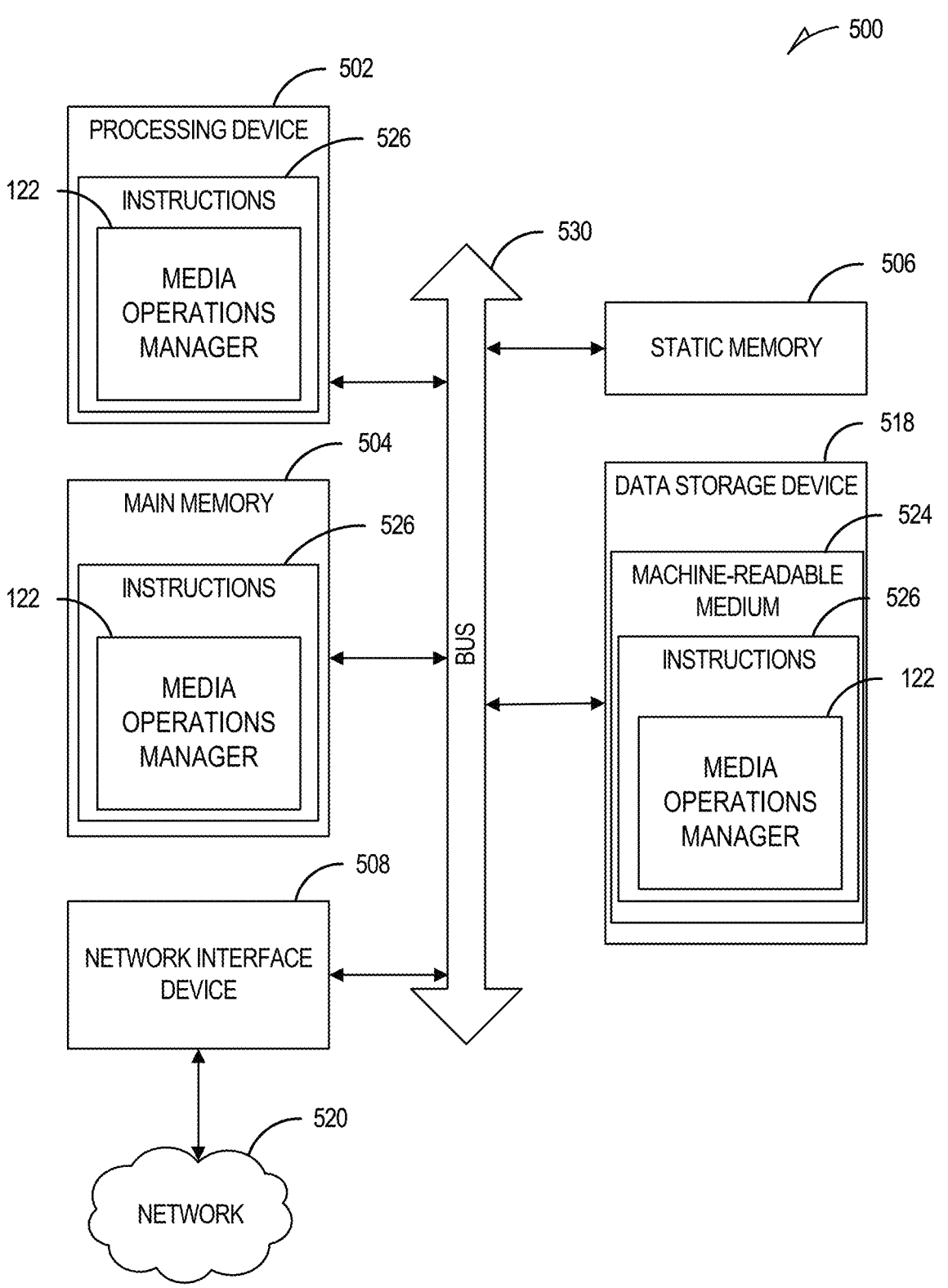
FIG. 5 is a block diagram illustrating a diagrammatic representation of a machine in the form of a computer system within which a set of instructions can be executed for causing the machine to perform any one or more of the methodologies discussed herein, in accordance with some examples.

FIG. 5 illustrates an example machine in the form of a computer system 500 within which a set of instructions can be executed for causing the machine to perform any one or more of the methodologies discussed herein. In some examples, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one example, the instructions 526 implement functionality corresponding to the media operations manager 122 of FIG. 1. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
a set of memory components of a memory sub-system; and
at least one processing device operatively coupled to the set of memory components, the at least one processing device being programmed to perform operations comprising:
determining how many write cursors are in a plurality of write cursors;
generating a plurality of internal zone groups (IZGs) based on how many write cursors are in the plurality of write cursors;
associating a plurality of zones of the set of memory components with the plurality of IZGs, each IZG being associated with a different write cursor of the plurality of write cursors;
programming data to a first portion of the set of memory components using the plurality of write cursors, the first portion of the set of memory components being associated with a first type of storage;
determining that an individual IZG of the plurality of IZGs satisfies a migration criterion; and
in response to determining that the individual IZG of the plurality of IZGs satisfies the migration criterion, migrating a portion of the data stored in the first portion of the set of memory components corresponding to the individual IZG to a second portion of the set of memory components, the second portion of the set of memory components being associated with a second type of storage.

2. The system of claim 1, wherein the first type of storage comprises a single-level cell (SLC) storage type, and wherein the second type of storage comprises a multi-level cell (MLC) storage type.

3. The system of claim 1, wherein the first type of storage comprises a single-level cell (SLC) storage type, and wherein the second type of storage comprises a quad-level cell (QLC) storage type.

4. The system of claim 1, wherein the migration criterion comprises a minimum quantity of zones that are ready to be migrated.

5. The system of claim 4, the operations further comprising:
storing a plurality of counters each associated with a different IZG, each counter of the plurality of counters representing a quantity of zones in a respective IZG ready for migration from the first type of storage to the second type of storage.

6. The system of claim 5, the operations further comprising:
receiving, from a host, a request to program data into a first zone of the plurality of zones;
determining that the first zone is associated with the individual IZG;
identifying an individual write cursor of the plurality of write cursors that is associated with the individual IZG; and
programming the data to the first zone using the individual write cursor in the first portion of the set of memory components.

7. The system of claim 6, the operations further comprising:
determining that the first zone has finished being programmed by the host; and
incrementing an individual counter of the plurality of counters that is associated with the individual IZG.

8. The system of claim 7, the operations further comprising:
determining that the first zone has finished being programmed by the host in response to determining that a last logical block address (LBA) associated with the first zone has been programmed with data.

9. The system of claim 5, the operations further comprising:
comparing a first value of a first counter of the plurality of counters to a second value of a second counter of the plurality of counters;
determining that a first IZG is associated with a greater number of zones ready for migration than a second IZG in response to determining that the first value is greater than the second value; and
migrating data of the zones associated with the first IZG stored in the first portion of the set of memory components to the second portion of the set of memory components in response to determining that the first IZG is associated with the greater number of zones ready for migration than the second IZG.

10. The system of claim 1, the operations further comprising:
after migrating the portion of the data corresponding to the individual IZG, migrating a second portion of the data stored in the first portion of the set of memory components, the second portion corresponding to a second IZG to the second portion of the set of memory components.

11. The system of claim 1, wherein the first portion of the set of memory components comprises a single-level cell (SLC) cache.

12. The system of claim 1, the operations further comprising:
folding data corresponding to the individual IZG.

13. The system of claim 1, the operations further comprising:
programming host data to a first portion of the plurality of IZGs; and preserving a second portion of the plurality of IZGs for writing additional host data while data from the first portion of the plurality of IZGs is being migrated from the first type of storage to the second type of storage.

14. The system of claim 1, the operations comprising:

storing a plurality of counters each associated with a different IZG, each counter of the plurality of counters representing a quantity of zones in a respective IZG ready for migration from the first type of storage to the second type of storage.

15. The system of claim 1, further comprising:

generating a quantity of IZGs corresponding to double a number of write cursors.

16. The system of claim 15, the operations further comprising:

storing an active zone table that maps each of the plurality of zones to a corresponding IZG, the active zone table mapping a first set of zones of the plurality of zones to a first IZG, and the active zone table mapping a second set of zones of the plurality of zones to a second IZG.

17. The system of claim 16, the operations further comprising:

receiving a request from a host to program data to an individual zone of the plurality of zones;

determining, based on the active zone table, that the individual zone is included in the first set of zones that is associated with the first IZG; and selecting an individual write cursor from the plurality of write cursors by computing a modulo operation of a number representing the individual zone and a number representing how many write cursors are in the plurality of write cursors.

18. The system of claim 17, the operations further comprising:

programming data to the first portion of the set of memory components using the selected individual write cursor.

19. A method comprising:

determining how many write cursors are in a plurality of write cursors;

generating a plurality of internal zone groups (IZGs) based on how many write cursors are in the plurality of write cursors;

associating a plurality of zones of a set of memory components with the plurality of IZGs, each IZG being associated with a different write cursor of the plurality of write cursors;

programming data to a first portion of a set of memory components using the plurality of write cursors, the first portion of the set of memory components being associated with a first type of storage;

determining that an individual IZG of the plurality of IZGs satisfies a migration criterion; and in response to determining that the individual IZG of the plurality of IZGs satisfies the migration criterion, migrating a portion of the data stored in the first portion of the set of memory components corresponding to the individual IZG to a second portion of the set of memory components, the second portion of the set of memory components being associated with a second type of storage.

20. A non-transitory computer-readable storage medium comprising instructions that, when executed by at least one processing device, cause the at least one processing device to perform operations comprising:

associating a plurality of zones of a set of memory components with a plurality of internal zone groups (IZGs), each IZG being associated with a different write cursor of a plurality of write cursors, a first write cursor of the plurality of write cursors grouping a first collection of zones into a first set of block stripes, and a second write cursor of the plurality of write cursors grouping a second collection of zones into a second set of block stripes;

programming data to a first portion of a set of memory components using the plurality of write cursors, the first portion of the set of memory components being associated with a first type of storage;

determining that an individual IZG of the plurality of IZGs satisfies a migration criterion; and in response to determining that the individual IZG of the plurality of IZGs satisfies the migration criterion, migrating a portion of the data stored in the first portion of the set of memory components corresponding to the individual IZG to a second portion of the set of memory components, the second portion of the set of memory components being associated with a second type of storage.

* * * * *